United States Patent [19]

Scragg

[11] 3,996,953
[45] Dec. 14, 1976

[54] APPARATUS FOR DOSING A FLOWING FLUID

[76] Inventor: Edgar Peter Scragg, 60 Mulder St., Florida Park Extension 3., Florida, Transvaal Province, South Africa

[22] Filed: Aug. 18, 1975

[21] Appl. No.: 605,684

[30] Foreign Application Priority Data

Aug. 19, 1974 South Africa .................. 74/5307

[52] U.S. Cl. .................... 137/101.11; 137/564.5; 222/104
[51] Int. Cl.² ........................... G05D 11/00
[58] Field of Search ........... 137/99, 101.11, 564.5; 222/104; 239/310, 314, 315, 316, 323, 324

[56] References Cited

UNITED STATES PATENTS

| | | | |
|---|---|---|---|
| 1,328,942 | 1/1920 | Carter | 239/315 X |
| 1,409,544 | 3/1922 | Hollock | 222/104 |
| 2,723,779 | 11/1955 | Parker et al. | 222/104 |
| 2,867,830 | 1/1959 | Usdavin | 222/104 X |
| 3,155,113 | 11/1964 | Germeshausen | 239/315 X |
| 3,199,957 | 8/1965 | Vivion | 239/315 X |
| 3,407,968 | 10/1968 | Fiquet et al. | 222/104 |

FOREIGN PATENTS OR APPLICATIONS

| | | | |
|---|---|---|---|
| 394,454 | 4/1924 | Germany | 222/104 |
| 495,856 | 2/1937 | United Kingdom | 222/104 |

*Primary Examiner*—William R. Cline
*Attorney, Agent, or Firm*—Pollock, Vande Sande & Priddy

[57] ABSTRACT

A device for dosing a flowing fluid with an additive is disclosed. The device has a casing through which the fluid flows and the additive is contained in a bag of flexible material. One end of the bag is held against rotation and the other end of the bag is fast in rotation with a vaned rotor. The flowing fluid is directed onto the rotor vanes so as to cause rotation of the rotor. In use, rotation of the end of the bag attached to the rotor with respect to the other end of the bag causes the bag to be twisted and the volume thereof reduced. A nozzle structure which forms part of the bag includes a bore and the contents of the bag are forced through this bore into the flowing fluid as the volume of the bag is reduced. In an alternative form, the fluid flows through spiral passages of the rotor to achieve the desired torque.

15 Claims, 10 Drawing Figures

//! # United States Patent [19]

Scragg

[11] 3,996,953
[45] Dec. 14, 1976

[54] APPARATUS FOR DOSING A FLOWING FLUID

[76] Inventor: Edgar Peter Scragg, 60 Mulder St., Florida Park Extension 3., Florida, Transvaal Province, South Africa

[22] Filed: Aug. 18, 1975

[21] Appl. No.: 605,684

[30] Foreign Application Priority Data

Aug. 19, 1974  South Africa ............... 74/5307

[52] U.S. Cl. .................. 137/101.11; 137/564.5; 222/104
[51] Int. Cl.² ........................... G05D 11/00
[58] Field of Search ......... 137/99, 101.11, 564.5; 222/104; 239/310, 314, 315, 316, 323, 324

[56] References Cited

UNITED STATES PATENTS

| | | | |
|---|---|---|---|
| 1,328,942 | 1/1920 | Carter | 239/315 X |
| 1,409,544 | 3/1922 | Hollock | 222/104 |
| 2,723,779 | 11/1955 | Parker et al. | 222/104 |
| 2,867,830 | 1/1959 | Usdavin | 222/104 X |
| 3,155,113 | 11/1964 | Germeshausen | 239/315 X |
| 3,199,957 | 8/1965 | Vivion | 239/315 X |
| 3,407,968 | 10/1968 | Fiquet et al. | 222/104 |

FOREIGN PATENTS OR APPLICATIONS

| | | | |
|---|---|---|---|
| 394,454 | 4/1924 | Germany | 222/104 |
| 495,856 | 2/1937 | United Kingdom | 222/104 |

*Primary Examiner*—William R. Cline
*Attorney, Agent, or Firm*—Pollock, Vande Sande & Priddy

[57] ABSTRACT

A device for dosing a flowing fluid with an additive is disclosed. The device has a casing through which the fluid flows and the additive is contained in a bag of flexible material. One end of the bag is held against rotation and the other end of the bag is fast in rotation with a vaned rotor. The flowing fluid is directed onto the rotor vanes so as to cause rotation of the rotor. In use, rotation of the end of the bag attached to the rotor with respect to the other end of the bag causes the bag to be twisted and the volume thereof reduced. A nozzle structure which forms part of the bag includes a bore and the contents of the bag are forced through this bore into the flowing fluid as the volume of the bag is reduced. In an alternative form, the fluid flows through spiral passages of the rotor to achieve the desired torque.

15 Claims, 10 Drawing Figures

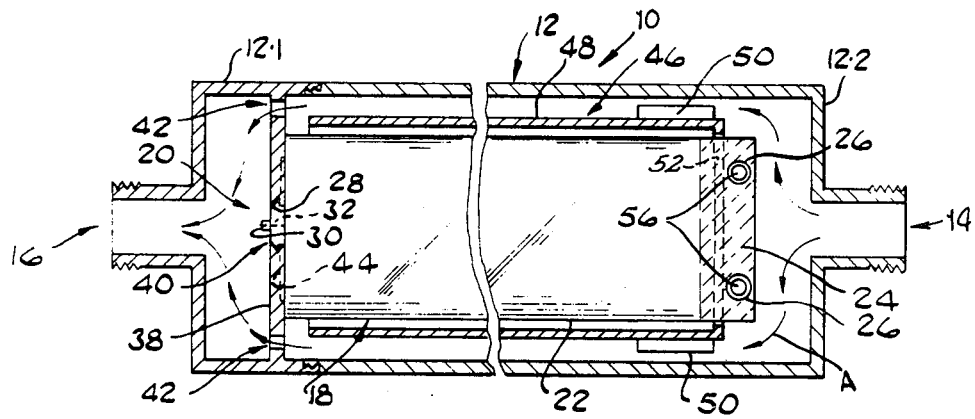

APPARATUS FOR DOSING A FLOWING FLUID

This invention relates to the dosing of a flowing fluid with an additive and relates specifically, but not exclusively, to the dosing of a flowing airstream with a lubricant.

According to one aspect of the present invention, there is provided apparatus for dosing a flowing fluid, the apparatus comprising a casing having an inlet and an outlet, securing means within the casing for preventing one end of an additive container from rotating, a rotatable element within the casing for receiving and holding fast in rotation therewith the other end of an additive container, a structure for producing a torque for rotating said element in one direction, and means for directing flowing fluid against said structure so as to produce a torque for rotating said element with respect to said securing means.

Said element can be in the form of a sleeve having a transverse wall at one end thereof, there being means for securing an additive container to said transverse wall. In this form said structure for producing a torque can be constituted by at least one vane projecting outwardly from said sleeve.

The element can be constituted by a vaned rotor having a hub formed to receive an additive container and a ring of vanes around the periphery of the hub portion.

In one constructional form, said means for directing flowing fluid comprises components defining a passageway extending parallel to, and offset with respect to, the axis of rotation of the rotor, the passageway being aligned with the ring of vanes which vanes are arranged to produce a torque when subjected to fluid flowing through said passageway.

In another form, said rotor is in a rotor chamber having a peripheral wall enclosing the rotor, and said means for directing flowing fluid against said structure comprises components defining an inlet in said peripheral wall.

Means can be provided for preventing rotation of the rotor in the direction opposite to said one direction. Such means can comprise a ratchet formation, a detent element, and a spring urging said dentent element into engagement with said ratchet formation.

Where said inlet is in the peripheral wall, said casing can comprise an upper part having a top wall with an outlet therein and a depending, circular, side wall, said upper part forming the rotor chamber and said inlet being in said circular side wall, a lower part of vertically elongated form, means for attaching said lower part to said upper part so that the lower part depends from the upper part and forms a space below the rotor for receiving an additive container, a normally closed outlet at the bottom of said lower part, and a removable element closing said outlet.

According to a further aspect of the present invention there is provided, in combination, an additive container and apparatus for dosing a flowing fluid with additive from the container, said apparatus comprising a casing having an inlet and an outlet, securing means within the casing for preventing one end of said additive container from rotating, a rotatable element within the casing receiving and holding fast in rotation therewith the other end of said additive container, a structure for producing a torque for rotating said element in one direction and means for directing flowing fluid against said structure so as to produce a torque for rotating said element with respect to said securing means, and said container comprising a bag of flexible material for containing the additive and a nozzle structure including a bore through which the additive emerges from the bag, said other end of said additive container being fast in rotation with said rotatable element and said one end being held against rotation by the securing means.

Said nozzle can be at said other end of the bag and said casing can be formed with grooves extending parallel to the axis about which the rotor rotates, there being elements projecting laterally at said one end of the bag and entered in said grooves to prevent rotation of said one end with respect to the casing.

For a better understanding of the present invention, and to show how the same may be carried into effect, reference will now be made, by way of example, to the accompanying drawings, in which:

FIG. 5 is a vertical section through a further form of apparatus for dosing a flowing fluid;

FIG. 6 is a pictorial view of a part of the rotor of the apparatus of FIG. 5;

FIG. 7 is a section on the line VII—VII of the apparatus of FIG. 5;

FIG. 8 illustrates a modification of the apparatus of FIG. 5;

Figure 1:
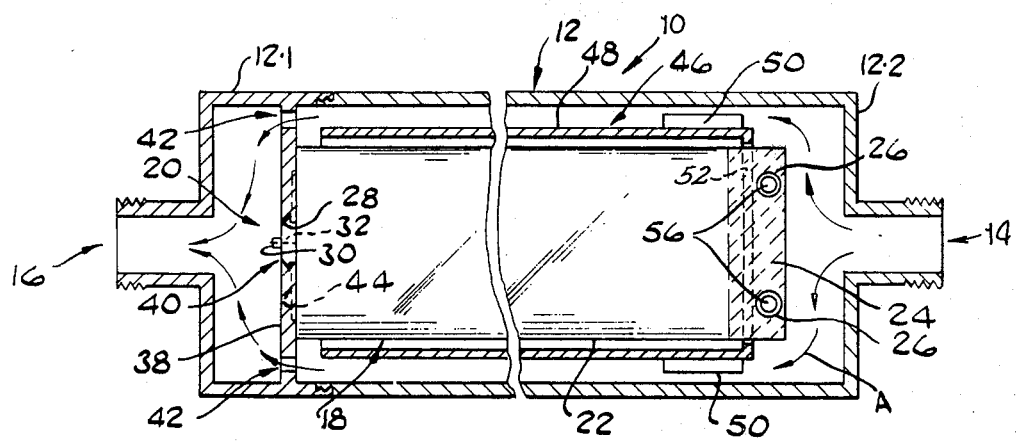
FIG. 1 is a section through apparatus for dosing a flowing fluid.
Figure 2:
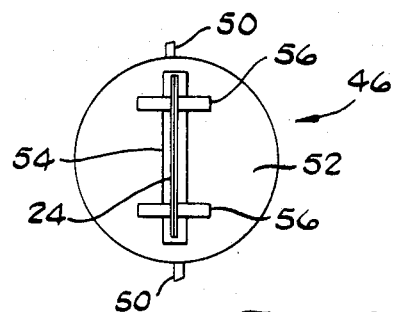
FIG. 2 is a view taken in the direction of arrow II of FIG. 1.

Referring firstly to FIG. 1, reference numeral 10 generally indicates apparatus for dosing a flowing fluid. The apparatus includes a casing 12 consisting of casing parts 12.1 and 12.2, an inlet 14 and an outlet 16. The inlet and the outlet are threaded so as to enable the casing to be connected into a fluid line (not shown). The primary use of the apparatus is to dose, with a lubricant, an airstream flowing to a piece of pneumatic apparatus such as a rock drill.

Figure 3:
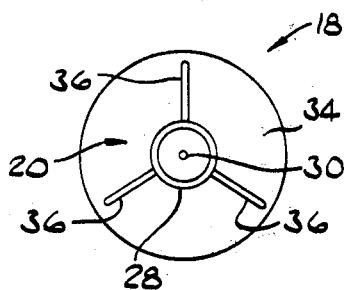
FIG. 3 is an end view of the front end of a collapsible container.

The additive is within a container 18 (which is shown diagrammatically in elevation), the container comprising a nozzle structure 20 and a collapsible tubular, bag 22 of flexible material such as a transparent or translucent synthetic plastics material. The material must, of course, be impervious to the additive. The end of the bag 22 remote from the nozzle structure 20 is closed by a transverse weld 24 in which there are eyelets 26. The nozzle structure 20 includes an external, peripherally extending rib 28 and a spigot 30, the spigot 30 blocking the outer end of a fine metering bore 32 which leads from the interior of the bag. The nozzle structure 20 is intergral with, and at the center of, the disc-like end wall 34 (see FIG. 3) to the outer periphery of which the bag 22 is sealed. Three radially extending ribs 36 are formed on the front face of the wall 34.

Adjacent the outlet 16 there is a transverse partition 38, the partition having a central bore 40 for receiving the nozzle structure 20. It will be noted that a circumferentially extending groove is formed in the wall of the bore, this groove receiving the rib 28 to locate the container 18. A ring of apertures 42 in the partition 38 places the upstream and downstream sides of the partition in communication with one another. Three radially extending grooves 44 are formed in the partition 38, these grooves receiving the ribs 36 to prevent the container 18 rotating with respect to the partition 38.

The container 18 is within a rotatable element 46 which comprises a sleeve 48, one or more projecting vanes 50 (two are shown) and a transverse wall 52. The wall has a diametrically extending slot 54 therein and the transverse weld 24 projects from the element 46 through the slot 54. A pair of pins 56, passed through the eyelets 26, serves to prevent the welded end of the container 18 from pulling through the slot 54.

The vanes 50 project outwardly from the sleeve 48. The number of vanes, their length and the helix angle thereof are chosen so that the fluid flowing past the vanes (the path of which is shown by arrows A), by its reaction on the vanes, exerts a torque of the requisite magnitude on the element 46. The vanes 50, while shown spaced from the casing 12, can be in contact therewith at the bottom of the casing so as loosely to locate the element 46 while not interfering with its free rotation. The sleeve 48 and vanes 50 together constitute a vaned rotor.

In use, the two parts 12.1 and 12.2 of the casing 12 are separated and the element 46 is thereafter detached from the casing 12. As the element 46 is withdrawn, the nozzle structure 20 leaves the bore 40, the rib 28 deforming resiliently as this occurs. The pins 56 are then removed from the eyelets 26 so that the empty container 18 can be discarded. A fresh container 18 is dropped into the sleeve 48 and the weld 24 caused to pass through the slot 54. The pins 56 are passed through the eyelets 26 so that the container 18 and element 46 are then fast in rotation with one another. The spigot 30 is removed at this stage to open the metering bore 32. In this connection it should be noted that the spigot 30 has only been shown in FIG. 1 for illustrative purposes but would, by the time the stage of FIG. 1 is reached, have been removed.

The nozzle structure 20 is then passed into the bore 40 and it will be understood that, until the ribs 36 seat in the grooves 44, the structure 22 cannot be pressed sufficiently far into the bore 40 to cause the rib 28 to engage in the circumferential groove which encircles the bore 40. Finally the casing 12 is closed by screwing the parts 12.1 and 12.2 together.

When fluid, e.g., air, flows from the inlet 14 to the outlet 16 as shown by the arrows A, it is directed by the wall 52 outwardly into the annular passage between the sleeve 48 and casing part 12.2. It impinges on the vanes 50 and as a result a torque is exerted on the element 46. As the element 46 rotates, one end of the container 18 is rotated with respect to the other to wind up the bag 22, and hence the volume of the bag decreases so that the additive is forced through the bore 32. As the additive emerges from the bore it is entrained by the flowing air and carried to the pneumatic apparatus.

It will be noted that a venturi effect is created at the open mouth of the bore 32 by the flowing air. There is thus no back pressure on the bore 32 which would resist flow of additive from the bore. Downstream of the low pressure zone there is a region of turbulence in which the additive drops which have emerged from the bore 32 are atomised (assuming that the air flow-rate is sufficiently great).

In an alternative construction, not shown, the element 46 can be in the form of two half shells with the wall 52 split diametrically. One dimetrically extending face of the wall 52 can have therein a pair of apertures, and the diametrically extending face of the other wall half can be formed with a pair of projecting pins. When the shell halves are passed together to form the complete element 46, the pins enter the apertures and, as will readily be understood, can be made to pass through the eyelets 26 in the transverse weld 24. In this constructional form, some means such as an encircling band is required to hold the two shell halves together.

Figure 4:
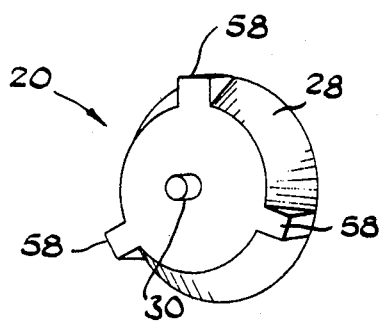
FIG. 4 is a view of a nozzle structure.

If reference is made to FIG. 4, it will be noted that the tapering front face of the rib 28 is formed with three protruberances 58. The front face of the groove in the bore 40 is, for use with a container having a nozzle structure of the form shown in FIG. 4, formed with three circumferentially spaced notches to receive the protruberances 58. This arrangement assists in preventing rotation of the container 18. It will be understood that the number of protruberances, and also the number of ribs 36, can be varied as desired.

Turning now to FIGS. 5 to 7, the apparatus shown in these Figures comprises a casing 60 which includes an upper part 62 having a top wall 64 and a depending, circular, side wall 66. The casing further comprises an inlet 68 for the flowing fluid, the inlet being in the circular side wall 66, and an outlet 70 for flowing fluid, the outlet being in the top wall 64. The casing 60 further comprises a lower part 72 which includes a generally cone-shaped portion 74. There is a dirt outlet 76 at the bottom of the cone-shaped lower portion 74 and an element 78, in the form of a bolt with a short shank, normally closes the outlet 76.

The lower section of the wall 66 is threaded and the upper portion of the cylindrical wall 80 of the lower part 72 is formed with a rib 82. Internally of the wall 66 there is a circumferential projection 84. A ring nut 86 is threaded onto the wall 66 and acts on the rib 82 to urge the upper end of the wall 80 against the projection 84.

The upper part 62 constitutes a rotor chamber, the rotor within the chamber being referenced 88 and being mounted by means of a bearing diagrammatically shown at 90. The outer race of the bearing is secured to the wall 66 and the inner race to the rotor. The bearing is not shown in FIG. 6. The rotor comprises a hub portion around the periphery of which there are vanes 92. The hub portion of the rotor is basically disc-like in form and is undercut around its periphery to form a curved, periphery extending guide surface 94. The vanes 92 occupy this undercut region.

If reference is made to FIG. 6, where the inlet 68 is diagrammatically shown, it will be seen that it is not radial with respect to the rotor 88 but angled so as to direct fluid onto the vanes in the desired direction.

At the center of the hub portion there is a blind bore 96 which serves to receive the neck 98 of an additive container 100. Both the wall of the bore 96 and the neck 98 are threaded and sealing between the rotor and the neck 98 is effected by means of a circular rib 102 which engages the end face of the bore 96. The bore 96 is continued through the rotor 88 by means of a fine bore 104, there being a projecting spigot 106 on the upper face of the rotor so that the bore 104 is extended towards the outlet 70. Passages 108 place the space below the rotor 88 in communication with the space above the rotor.

It is desired that the rotor rotates in one direction only and a detent structure 110 is provided for preventing rotation of the rotor in the direction opposite to that in which it is driven. The structure 110 comprises a detent element in the form of a ball 112, the ball 112 being located in a bore 114 in the top wall 64, the bore being closed by a threaded element 116 and there being a spring 118 between the element 116 and the ball 112. The upper face of the rotor 88 includes a rachet formation 120 which comprises a circular array of saw-tooth profile teeth. When the rotor is driven, the ball 112 rides up the inclined flanks of the teeth to permit such rotation, but prevents rotation in the reverse direction.

The container 100 is similar to the container 18, the end opposite the neck 98 being closed by a transverse weld 122 (see FIG. 7) which is shown in section in FIG. 5. Two strips of synthetic plastic material 124 and 126 sandwich the weld 122 between them. The strip 124 includes headed pins 128 which are pressed through apertures 130 in the transverse weld and through apertures 132 of the strip 126. As will be seen from FIG. 5, the strips 124 and 126 are longer than the weld 122 and project outwardly beyond the peripheral limits of the container 100. The ends of the strips 124 and 126 are entered in longitudinally extending grooves 134 of the lower part 72. Engagement between the grooves and strips prevents rotation of the lower end of the container 100.

In use, flowing fluid enters the rotor chamber through the inlet 68 and impinges on the ring of vanes 92, the surface 94 of the undercut formation 92 directing the air downwardly into the chamber in which the container 100 hangs. Dirt particles tend to collect at the lower end of the cone-shaped portion 74 and thereafter the air flows through the passages 108 to the outlet 70.

Interaction between the flowing fluid and the vanes 92 results in a torque being imposed on the rotor so that the upper end of the container 100 is turned with respect to the lower end. The effect of this is to wind-up the bag and reduce its volume so that additive is forced through the bore of the neck 98 into the fine bore 104 and thence to the outlet 70. Air flowing through the passages 108 creates a venturi effect at the outlet from the bore 104 so that there is no back pressure at this region. The rib 102 prevents leakage into the region of the neck threads.

When the container 100 is empty, it is replaced by unscrewing the ring nut 86 so that the lower part 72 can drop away, and then unscrewing the container 100 from the rotor 88. A full container can then be screwed into the central bore 96 of the rotor and the lower part 72 replaced.

In the modification of FIG. 8, the bearing 90 is omitted and three or more projections 136 are provided on the inner face of the circular side wall of the upper casing part. The upper casing part has been referenced 62.1 and its circular wall 66.1. The rotor has been referenced 88.1 and it will be seen that it includes a radially outwardly extending rib 138. During assembly, the rib 138 of the rotor 88.1 is forced past the projections 136 so that these are deformed upwardly and outwardly. When the rib 138 clears the projections deformed upwardly these "snap back" and the parts adopt the position illustrated. The upper faces of the projections 136 then form bearing surfaces for the rotor which is suspended by the rib 138. If a material such as "Nylon" is used for the material of the projections 136 and rotor 88.1, then friction is sufficiently low to permit rotation of the rotor when air flows through the apparatus.

Figure 9:
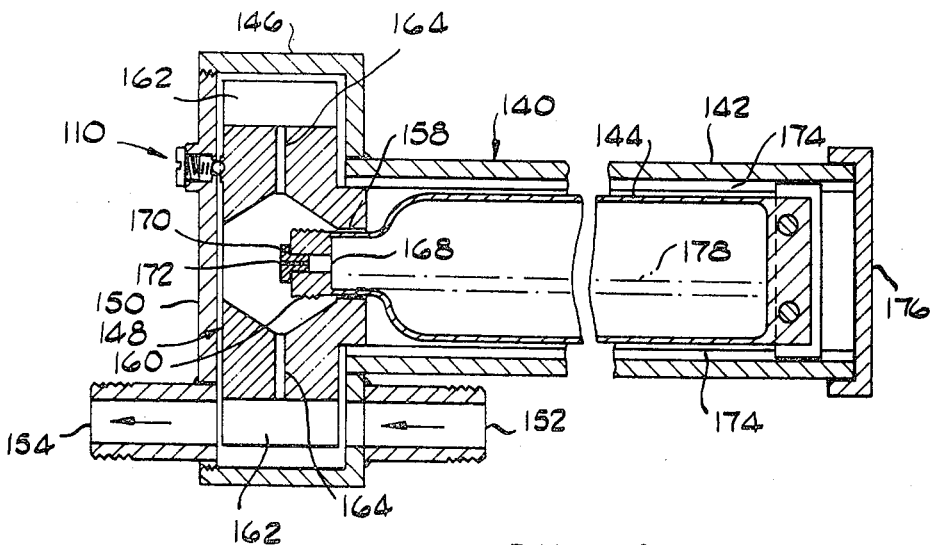
FIG. 9 is a vertical section through a further form of apparatus for dosing a flowing fluid.
Figure 10:
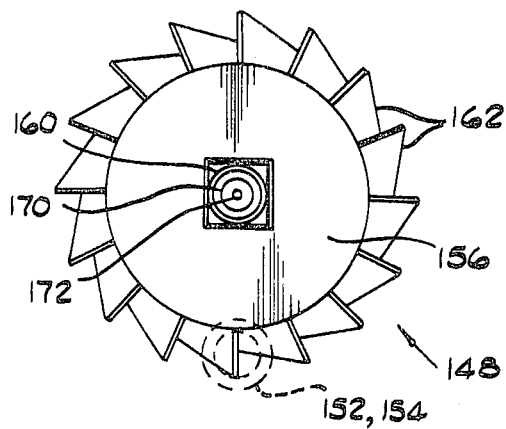
FIG. 10 is a front view of the rotor of the apparatus of FIG. 9.

Turning now to FIGS. 9 and 10, these FIGS. show an arrangement which is similar in many respects to that of FIG. 5 but which is intended to operate with the rotor turning about a horizontal rather than a vertical axis. This apparatus comprises a casing 140 having a smaller diameter part 142 which receives an additive container 144 and a larger diameter part 146 in which there is a rotor 148. A face plate 150 screwed into the open end of the larger diameter part 146 completes the rotor chamber.

The inlet for flowing fluid is shown at 152 and the outlet for flowing fluid is shown at 154.

The rotor 148 comprises a hub portion 156 in which there is a square aperture 158 for receiving a square part of the neck 160 of the container 144. Vanes 162 project outwardly from the hub portion 156 and, as will be seen from FIG. 10, the flow passage defined by the spigots which constitute the inlet 152 and outlet 154 are aligned with these vanes. Thus fluid flowing as shown by the arrows in FIG. 9 impinges on which ever one or more of the vanes 162 lies between these spigots and thereby exerts a torque on the rotor.

Within the rotor there is a plurality of radially extending bores 164 which place the central aperture of the rotor 148 in communication with the periphery of the rotor. The rotor further includes a spigot portion which centers the rotor in the casing part 142 and forms the bearing for the rotor.

The neck 160 of the container 144 includes an outlet bore 168 in which there is a plug 170. The plug 170 is a push fit in the bore 169 and itself includes a fine metering bore 172.

The square part of the neck 160 matches the square aperture 158 and the container 144 is therefore rendered fast in rotation with the rotor 148. The neck also includes a circular portion through which the bore 168 is formed. The outer perphery of the circular portion is threaded and a cap (not shown) can be provided over this to prevent leakage from the container 144 prior to its being mounted in the casing 140.

The end of the container 144 remote from the neck 160 is exactly the same as the lower end of the casing 100 in FIG. 5. Consequently, this structure will not be described in detail again. It will be noted that the casing part 144 is formed with two longitudinally extending grooves 174 which are equivalent to the grooves 134 of FIG. 5.

Flow of fluid through the apparatus from the inlet 152 to the outlet 154 causes rotation of the rotor 148 and hence of one end of the container 144 with respect to the other. The bag is thus wound up and lubricant which emerges from the fine bore 172 flows through the bores 164 so as eventually to reach the inter-blade spaces from which it is carried away by the flowing fluid.

A structure for preventing reverse rotation of the rotor is shown at 110, this structure being identical to that shown in FIG. 5.

The detent structures 110 prevent reverse rotation of the rotors and hence prevent the containers from unwinding. This assures that, particularly where the fluid flow is intermittent, the additive is always under pressure in the container and the application of torque immediately results in additive being expelled. If the bag is free to unwind, then a long burst of air or liquid is required to re-wind the unwound bag before the additive comes under pressure.

If one detent structure 110 is employed, the container can always unwind by up to one tooth pitch. By providing two or more such structures at spacings not equal to a whole multiple of the tooth pitch, the permitted degree of unwinding can be reduced to one half or one third (where two or three structures are employed) of the tooth pitch.

The casings described can be of transparent material so that the condition of the container can readily be seen and the volume of additive remaining calculated.

The embodiment of FIGS. 5 etc. is specifically intended for use on pneumatic machinery where the ability of the apparatus to filter out dirt particles is advantageous. The embodiment of FIGS. 9 and 10 finds particular application in gardening and agriculture where it can be used to dose irrigation water with fertilizer and insecticide. For such a purpose the fact that the container can readily be re-filled after removal of the plug 170 is a great advantage. The user can then mix whatever substance he requires, fill the container 144, locate it in the casing 140, replace the end cap 176 and turn the water supply on. In this connection it will be noted that desirably the outlet from the bores 164 are at "dead" or low-pressure regions between the vanes 162 so that there is a suction effect.

If the containers 22, 100 and 144 are relatively short, there is a tendency for them to wind-up at the center. This can result in additive being trapped at the end of the container remote from the nozzle and not being dispensed. This difficulty can be overcome by providing a tube in the container to form a flow path from end to end. This has been diagrammatically illustrated in FIG. 9 where a tube 178 has been shown but can be employed in relation to the other embodiments.

I claim:

1. Apparatus for dosing a flowing fluid, the apparatus comprising a casing having an inlet and an outlet for said fluid, securing means within the casing for preventing one end of a flexible twistable additive container from rotating, a rotatable element within the casing for receiving and holding fast in rotation therewith the other end of an additive container, a structure within the casing for producing a torque for rotating said element in one direction, and means for directing said flowing fluid against said structure so as to produce a torque for rotating said element with respect to said securing means.

2. Apparatus according to claim 1, in which said element is in the form of a sleeve having a transverse wall at one end thereof, there being means for securing an additive container to said transverse wall.

3. Apparatus according to claim 2, in which said structure for producing a torque is constituted by at least one vane projecting outwardly from said sleeve.

4. Apparatus according to claim 1, in which said element is in the form of a vaned rotor.

5. Apparatus according to claim 4, in which said rotor includes a hub portion formed to receive an additive container and a ring of vanes around the periphery of the hub portion.

6. Apparatus according to claim 5, in which said means for directing flowing fluid comprises components defining a passageway extending parallel to, and offset with respect to, the axis of rotation of the rotor, the passageway being aligned with the ring of vanes which vanes are arranged to produce a torque when subjected to fluid flowing through said passageway.

7. Apparatus according to claim 6, and including means for preventing rotation of the rotor in the direction opposite to said one direction.

8. Apparatus according to claim 7, in which said means comprises a rachet formation, a detent element, and a spring urging said detent element into engagement with said ratchet formation.

9. Apparatus according to claim 5, in which said rotor is in a rotor chamber having a peripheral wall enclosing the rotor, and said means for directing flowing fluid against said structure comprises components defining an inlet in said peripheral wall.

10. Apparatus according to claim 9, and including means for preventing rotation of the rotor in the direction opposite to said one direction.

11. Apparatus according to claim 10, in which said means comprises a ratchet formation, a detent element, and a spring for urging said detent element into engagement with said ratchet formation.

12. Apparatus according to claim 9, in which said casing comprises an upper part having a top wall with an outlet therein and a depending, circular, side wall, said upper part forming the rotor chamber and said inlet being in said circular side wall, a lower part of vertically elongated form, means for attaching said lower part to said upper part so that the lower part depends from the upper part and forms a space below the rotor for receiving an additive container, a normally closed outlet at the bottom of said lower part, and a removable element closing said outlet.

13. Apparatus according to claim 12, in which said lower part has a diametrically opposed pair of longitudinally extending grooves in the internal surface thereof, said grooves constituting said securing means.

14. In combination, an additive container and apparatus for dosing a flowing fluid with additive from the container, said apparatus comprising a casing having an inlet and an outlet for said fluid, securing means within the casing for preventing one end of said additive container from rotating, a rotatable element within the casing receiving and holding fast in rotation therewith the other end of said additive container, a structure within the casing for producing a torque for rotating said element in one direction, and means for directing said flowing fluid against said structure so as to produce a torque for rotating said element with respect to said securing means, and said container comprising a bag of flexible material for containing the additive and a nozzle structure including a bore through which the additive emerges from the bag, said other end of said additive container being fast in rotation with said rotatable element and said one end being held against rotation by the securing means.

15. The combination according to claim 14, in which said nozzle is at said other end of the bag and said casing is formed with grooves extending parallel to the axis about which the rotor rotates, there being elements projecting laterally at said one end of the bag and entered in said grooves to prevent rotation of said one end with respect to the casing.

* * * * *